US012651176B2

(12) United States Patent
Wheatley et al.

(10) Patent No.: US 12,651,176 B2
(45) Date of Patent: Jun. 9, 2026

(54) CONTINUOUS MAINTENANCE OF MODEL EXPLAINABILITY

(71) Applicant: KYNDRYL, INC., New York, NY (US)

(72) Inventors: Keri Wheatley, Austin, TX (US); Sanjana Sahayaraj, Sahayaraj (IN); Omar Odibat, Cedar Park, TX (US)

(73) Assignee: Kyndryl, Inc., New York, NY (US)

( * ) Notice: Subject to any disclaimer, the term of this patent is extended or adjusted under 35 U.S.C. 154(b) by 736 days.

(21) Appl. No.: 18/161,191

(22) Filed: Jan. 30, 2023

(65) Prior Publication Data

US 2024/0256916 A1    Aug. 1, 2024

(51) Int. Cl.
G06N 5/022 (2023.01)

(52) U.S. Cl.
CPC .................................... G06N 5/022 (2013.01)

(58) Field of Classification Search
CPC ...................................................... G06N 5/022
See application file for complete search history.

(56) References Cited

U.S. PATENT DOCUMENTS

| | | | | |
|---|---|---|---|---|
| 2013/0332398 | A1* | 12/2013 | Wu | G06N 20/00 706/12 |
| 2019/0102700 | A1* | 4/2019 | Babu | G06N 20/00 |
| 2019/0248394 | A1 | 8/2019 | Khan et al. | |
| 2020/0202268 | A1* | 6/2020 | Retna | G06N 20/00 |

| | | | | |
|---|---|---|---|---|
| 2020/0250548 | A1 | 8/2020 | Shwartz et al. | |
| 2020/0302318 | A1 | 9/2020 | Hetherington et al. | |
| 2021/0103838 | A1* | 4/2021 | Yuan | G06F 18/23 |
| 2021/0334693 | A1* | 10/2021 | Bavly | G06F 16/24578 |
| 2022/0208178 | A1* | 6/2022 | Sundaram | G06F 40/35 |
| 2022/0414522 | A1* | 12/2022 | Roy | G06N 20/20 |

(Continued)

FOREIGN PATENT DOCUMENTS

| | | | | | |
|---|---|---|---|---|---|
| CN | 111126461 | A | * | 5/2020 | ....... G06F 18/24323 |
| KR | 102177218 | B1 | * | 11/2020 | ............... B01L 7/52 |

(Continued)

OTHER PUBLICATIONS

Mingxuan Chen and Ning Wang and K. P. Subbalakshm, Explainable Rumor Detection using Inter and Intra-feature Attention Networks, Jul. 23, 2020 (Year: 2020).*

*Primary Examiner* — Kamran Afshar
*Assistant Examiner* — Gwynevere A Deterding
(74) *Attorney, Agent, or Firm* — CANTOR COLBURN LLP; Erik Swanson

(57) ABSTRACT

A computer-implemented method for model building with explainability is provided. The method includes receiving, by a hardware processor, a first metric and a second metric of minimum model performance. The first metric relates to data modeling quality and the second metric relates to model to business rule correlations. The method further includes performing, by the hardware processor, auto Artificial Intelligence model generation responsive to training data and a combination of the first and the second metrics of minimum model performance to obtain a model that is trained and meets model prediction accuracy and model prediction explainability requirements represented by the combination of the first and the second metrics of minimum model performance.

19 Claims, 8 Drawing Sheets

(56) References Cited

U.S. PATENT DOCUMENTS

| | | | | |
|---|---|---|---|---|
| 2023/0092777 A1* | 3/2023 | Nainar | ................... | G06N 3/098 726/23 |
| 2023/0362070 A1* | 11/2023 | Hsu | ........................ | G06Q 30/01 |
| 2025/0013921 A1* | 1/2025 | Moradi | .................. | G06N 3/082 |
| 2025/0086700 A1* | 3/2025 | Hartsell | ................. | G06Q 40/02 |

FOREIGN PATENT DOCUMENTS

| | | | | | |
|---|---|---|---|---|---|
| KR | 20210062612 A | * | 5/2021 | ....... | G06Q 10/06315 |
| WO | WO-2020000688 A1 | * | 1/2020 | ......... | G06Q 10/0635 |
| WO | 2020123985 A1 | | 6/2020 | | |
| WO | WO-2021042529 A1 | * | 3/2021 | .......... | G06F 16/345 |
| WO | 2021096564 A1 | | 5/2021 | | |
| WO | WO-2022194622 A1 | * | 9/2022 | ............... | A61B 5/70 |

* cited by examiner

Computing device — 100

Processor — 110

Communication subsystem
150

Memory
130

I/O subsystem
120

Data storage
140

Continuous maintenance of model
explainability over iterations in auto AI
140A

Peripheral
devices
160

400

Robot 1
431

Robot 2
432

Robot 3
433

Electronic product
order system
420

410

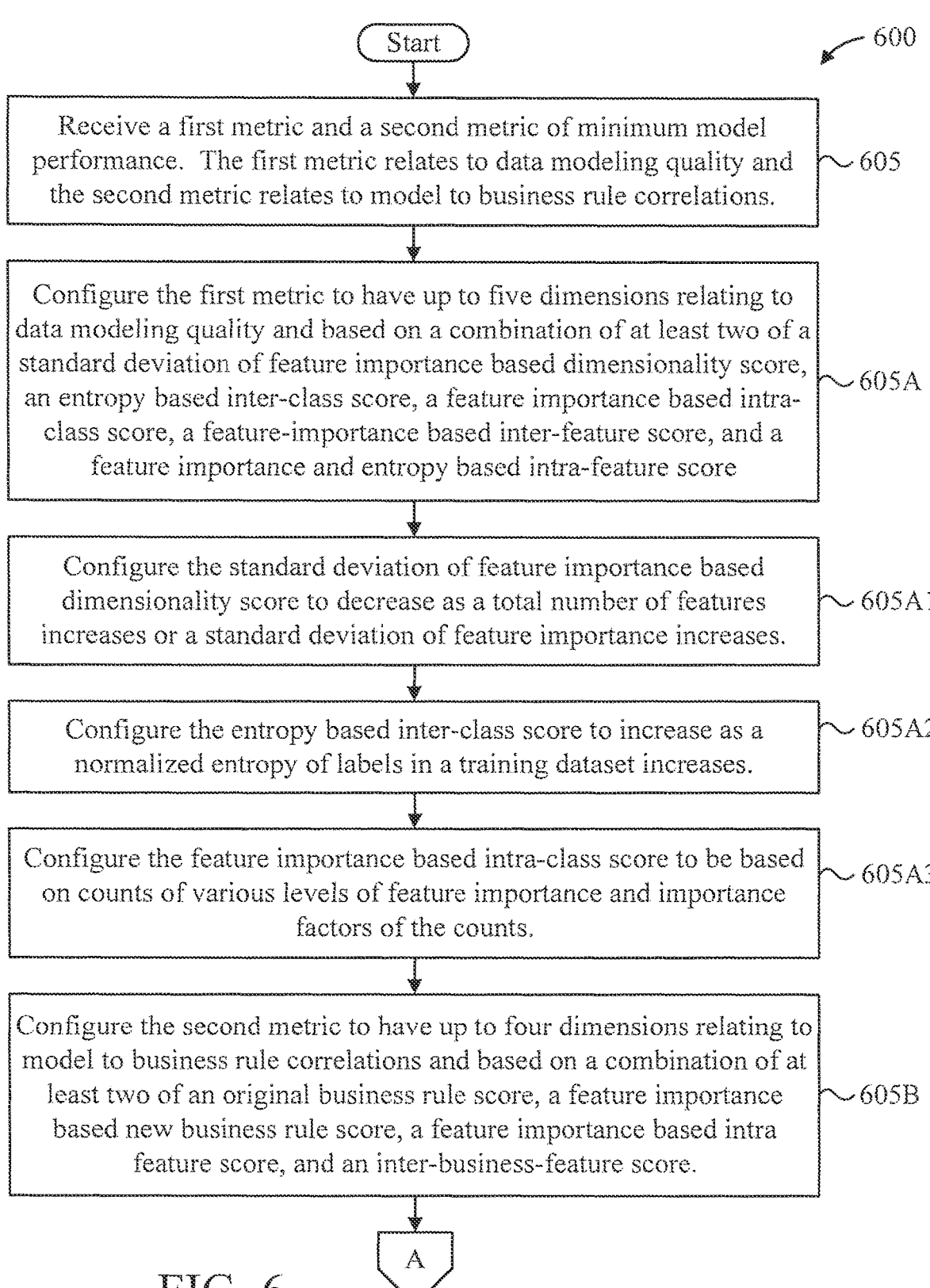

Start

600

Receive a first metric and a second metric of minimum model performance. The first metric relates to data modeling quality and the second metric relates to model to business rule correlations.

605

Configure the first metric to have up to five dimensions relating to data modeling quality and based on a combination of at least two of a standard deviation of feature importance based dimensionality score, an entropy based inter-class score, a feature importance based intra-class score, a feature-importance based inter-feature score, and a feature importance and entropy based intra-feature score

605A

Configure the standard deviation of feature importance based dimensionality score to decrease as a total number of features increases or a standard deviation of feature importance increases.

605A1

Configure the entropy based inter-class score to increase as a normalized entropy of labels in a training dataset increases.

605A2

Configure the feature importance based intra-class score to be based on counts of various levels of feature importance and importance factors of the counts.

605A3

Configure the second metric to have up to four dimensions relating to model to business rule correlations and based on a combination of at least two of an original business rule score, a feature importance based new business rule score, a feature importance based intra feature score, and an inter-business-feature score.

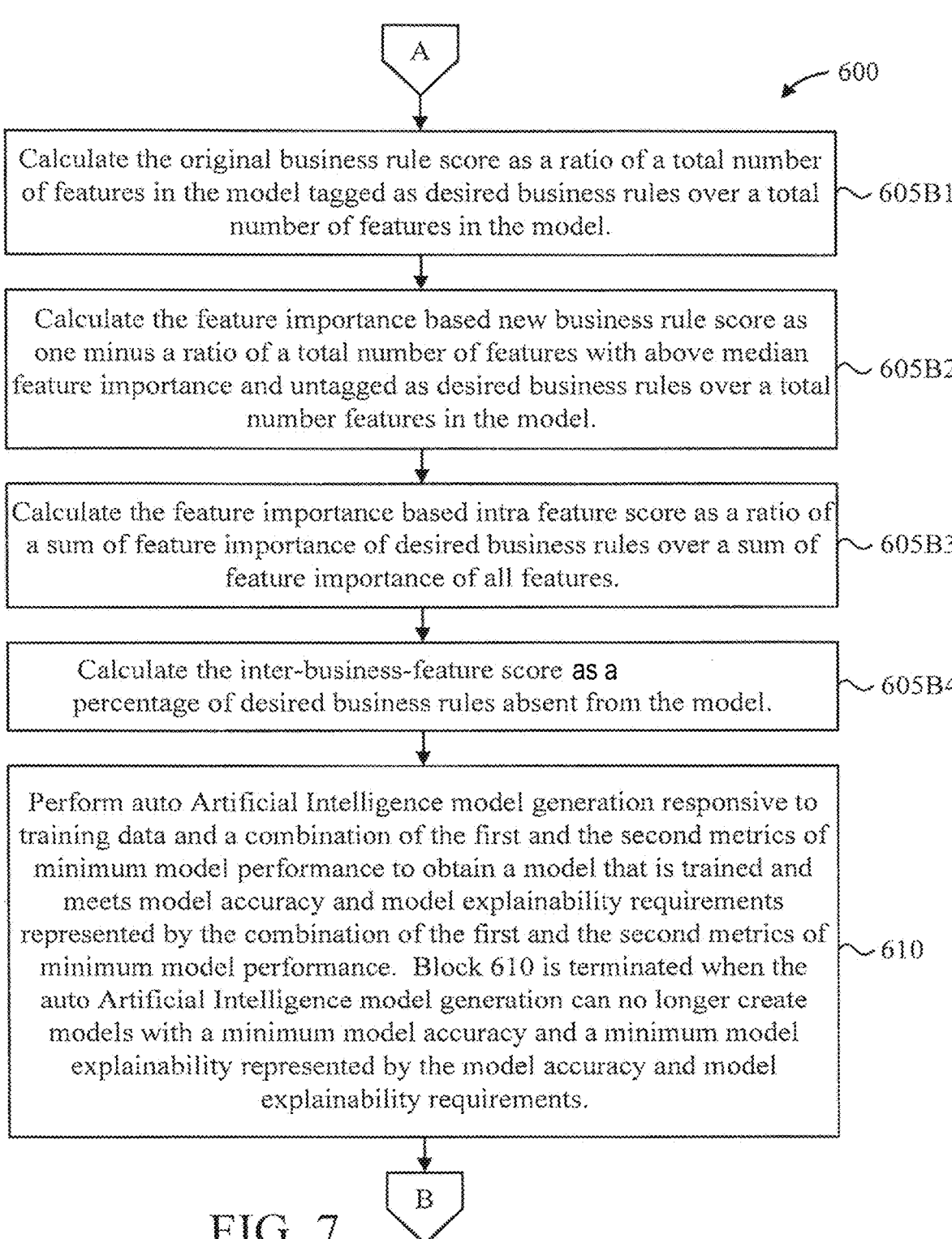

A

*600*

Calculate the original business rule score as a ratio of a total number of features in the model tagged as desired business rules over a total number of features in the model. — 605B1

Calculate the feature importance based new business rule score as one minus a ratio of a total number of features with above median feature importance and untagged as desired business rules over a total number features in the model. — 605B2

Calculate the feature importance based intra feature score as a ratio of a sum of feature importance of desired business rules over a sum of feature importance of all features. — 605B3

Calculate the inter-business-feature score as a percentage of desired business rules absent from the model. — 605B4

Perform auto Artificial Intelligence model generation responsive to training data and a combination of the first and the second metrics of minimum model performance to obtain a model that is trained and meets model accuracy and model explainability requirements represented by the combination of the first and the second metrics of minimum model performance. Block 610 is terminated when the auto Artificial Intelligence model generation can no longer create models with a minimum model accuracy and a minimum model explainability represented by the model accuracy and model explainability requirements. — 610

CONTINUOUS MAINTENANCE OF MODEL EXPLAINABILITY

BACKGROUND

The present invention generally relates to artificial intelligence, and more particularly to continuous maintenance of model explainability over iterations in artificial intelligence (AI) by leveraging business rules.

Model explainability is an important topic in machine learning today. Models in production must be retrained periodically as the underlying data distribution changes over time.

Current MLOps and auto AI tools focus on getting the best performing algorithm for the business problem based on metrics, such as accuracy, precision, and so forth. None of these tools currently optimize metrics while also maintaining explainability across model refreshes.

Maintaining explainability becomes important to solve the business problem in a credible and accountable way. Hence, there needs to be a set of techniques to hold the model to explainability standards and maintain that standard across refreshes for consistent and credible results. These techniques must be able to quantize such qualitative aspects and also clearly link them back to business rules/functionalities.

SUMMARY

According to aspects of the present invention, a computer-implemented method for prediction model building with prediction explainability is provided. The method includes receiving, by a hardware processor, a first metric and a second metric of minimum model performance. The first metric relates to data modeling quality and the second metric relates to model to business rule correlations. The method further includes performing, by the hardware processor, auto Artificial Intelligence model generation responsive to training data and a combination of the first and the second metrics of minimum model performance to obtain a model that is trained and meets model prediction accuracy and model prediction explainability requirements represented by the combination of the first and the second metrics of minimum model performance.

According to other aspects of the present invention, a computer program product for prediction model building with prediction explainability is provided. The computer program product includes a non-transitory computer readable storage medium having program instructions embodied therewith. The program instructions are executable by a computer to cause the computer to perform a method. The method includes receiving, by a hardware processor, a first metric and a second metric of minimum model performance. The first metric relates to data modeling quality and the second metric relates to model to business rule correlations. The method further includes performing, by the hardware processor, auto Artificial Intelligence model generation responsive to training data and a combination of the first and the second metrics of minimum model performance to obtain a model that is trained and meets model prediction accuracy and model prediction explainability requirements represented by the combination of the first and the second metrics of minimum model performance.

According to still other aspects of the present invention, a computer-implemented system for prediction model building with prediction explainability is provided. The system includes a memory device for storing program code. The system further includes a processor device operatively coupled to the memory device for running the program code to receive a first metric and a second metric of minimum model performance. The first metric relates to data modeling quality and the second metric relates to model to business rule correlations. The processor further runs the program code to perform auto Artificial Intelligence model generation responsive to training data and a combination of the first and the second metrics of minimum model performance to obtain a model that is trained and meets model prediction accuracy and model prediction explainability requirements represented by the combination of the first and the second metrics of minimum model performance.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6-8 are block diagrams showing an exemplary method, in accordance with an embodiment of the present invention.

DETAILED DESCRIPTION

Embodiments of the present invention are directed to continuous maintenance of model explainability over iterations in artificial intelligence (AI) by leveraging business rules.

One or more embodiments of the present invention allow for direct comparisons of existing models to new models to give a user a better understanding of the differences between the old and new models. This is particularly important for regulated industries where clearly explaining a decision, such as in a mortgage application rejection, is required by law.

Sometimes a user does not know what business rules they should or could implement in their model. One or more embodiments of the present invention can autogenerate business rule options based on historical models or datasets. Business rules that are autogenerated from historical models allow for the user to understand what business rules were used indirectly in the past and what similarities will reoccur between models.

This has two advantages. First, it allows for early stopping on model training once performance thresholds and business rules are met, thus improving the speed of model training and decreasing resource usage. Second, it allows for a certain amount of business rules and explainability rules to be incorporated into the model without decreasing the accuracy to a level that would make the model unusable in a real-world setting.

Explainability is an important aspect of a model. Rather than generating explainability metrics through proxy models, one or more embodiments of the present invention embed greater explainability into the model while also achieving a minimum level of model performance. This allows for greater transparency when using the model in a real-world setting.

While business rules are mentioned herein regarding application to the model, it is to be appreciated that other types of rules can also be employed while maintaining the spirit of the present invention. For example, medical rules can be considered business rules in that they relate to the business of medicine. Other rule types can also be included as readily appreciated by one of ordinary skill in the art.

Figure 1:
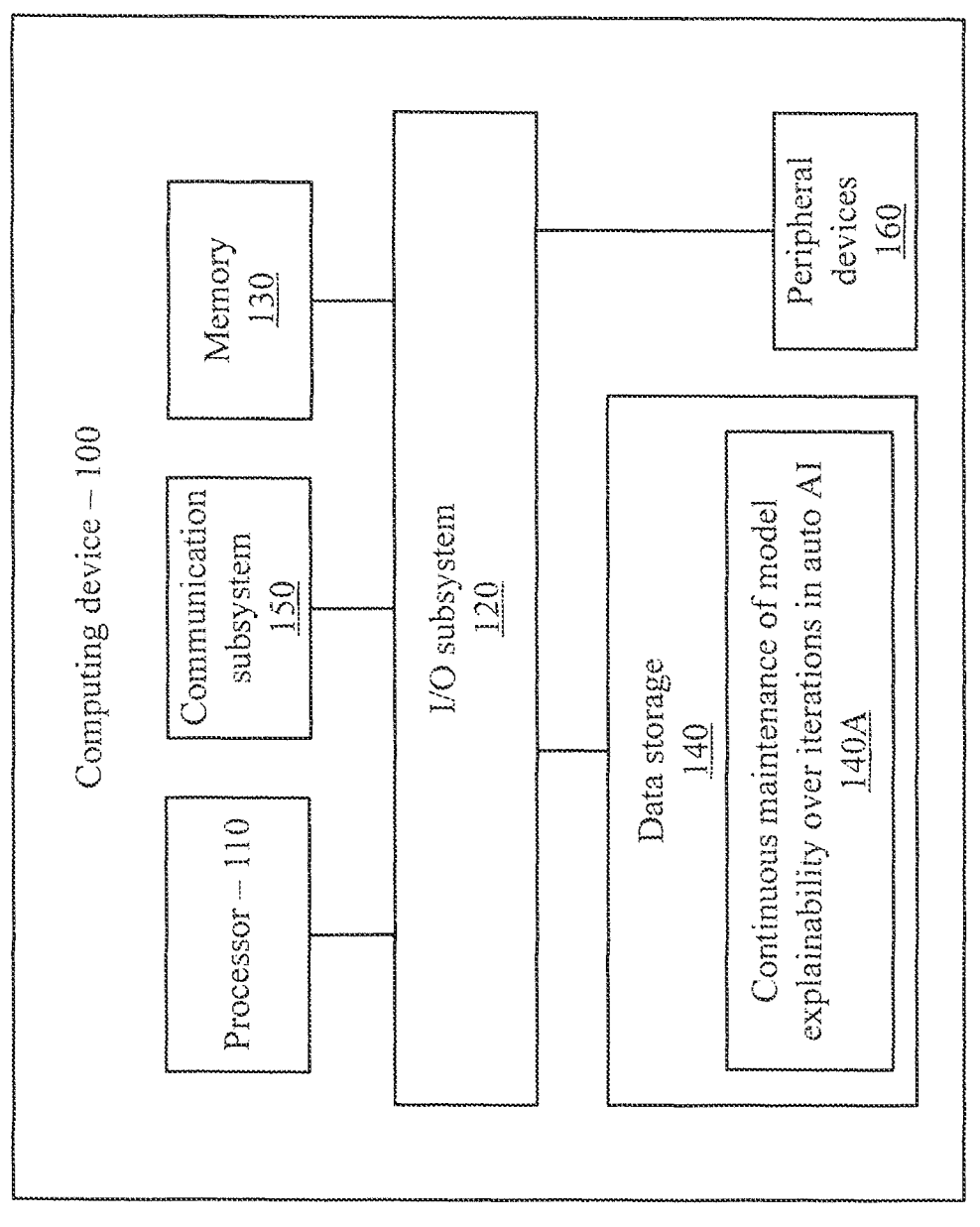
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform continuous maintenance of model explainability over iterations in auto AI by leveraging business rules.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for continuous maintenance of model explainability over iterations in auto AI by leveraging business rules. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Explainability of models involves understanding what the model does and how the model does it. It is important for the method of operation of any auto AI model to be in line with business rules and be credible in addition to other metrics. Two components of explainability used by one or more embodiments of the present invention are: (1) what is being recommended/proposed (a clear link from input to output); and (2) how is this being arrived at (which aspects of the input played a role in influencing the output).

Embodiments of the present invention can establish these dimensions through the following.

An idea of the invention is to weigh these aspects of a model and use this score to pick the best model fitting the business use case.

A minimum acceptable explainability score can be present or set by a user to reduce the auto AI model search time through early stopping. This is done in a way that also does not compromise on model accuracy. Hence, the most accurate model with credible results as established through explainability being in line with business expectations is picked.

One or more embodiments of the present invention provide a method to detect, measure, and hold a model to acceptable explainability and business standards throughout its lifecycle. It can potentially be a plugin for current auto AI frameworks and libraries or become an embedded component of future auto AI workflows.

Figure 2:
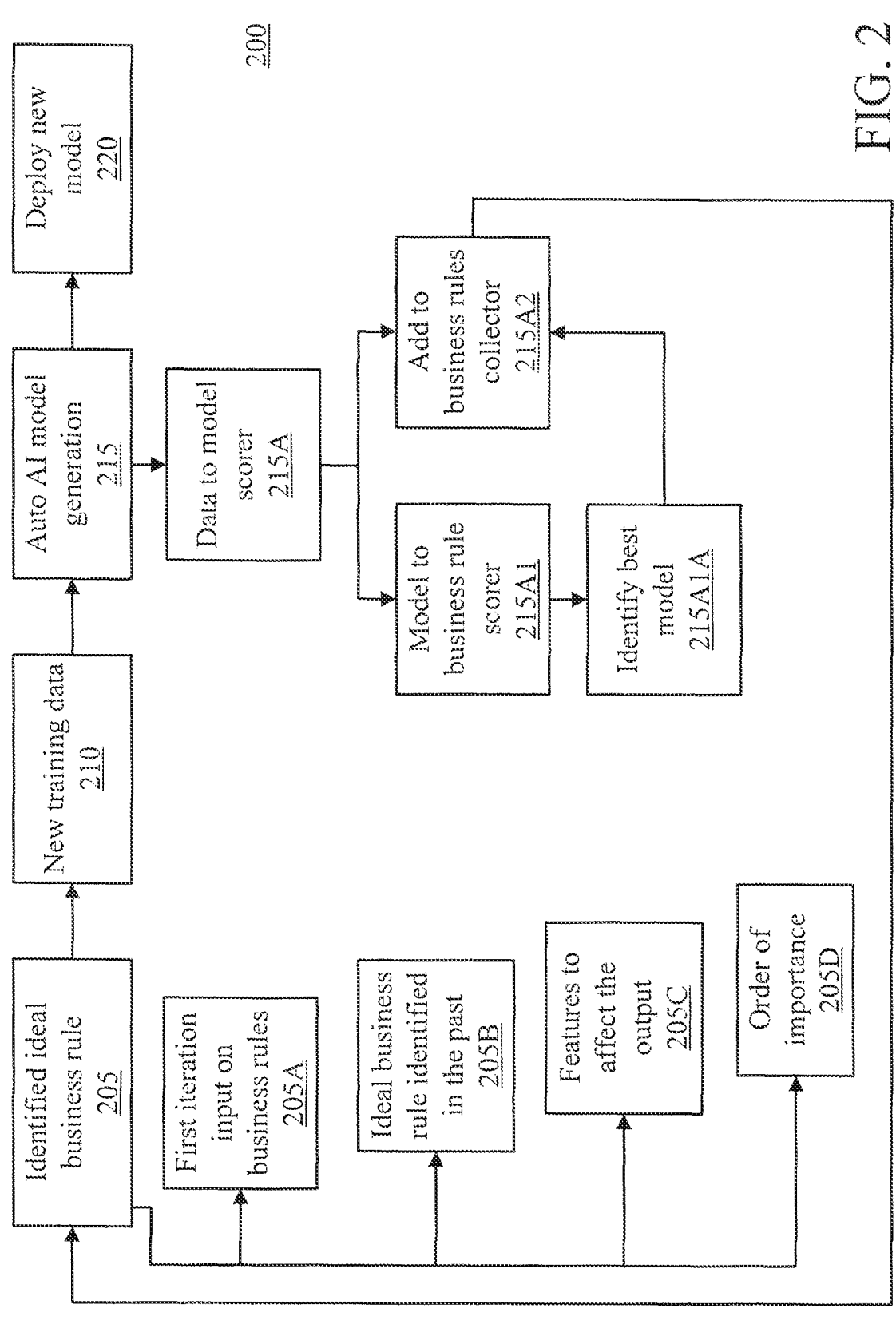
FIG. 2 is a high-level block diagram showing an exemplary system flow, in accordance with an embodiment of the present invention.

FIG. 2 is a high-level block diagram showing an exemplary system flow 200, in accordance with an embodiment of the present invention.

At block 205, input identified ideal business rule.

(1) Identify Ideal Business Rule:
   (a) This can be an optional step; if no desired business rules are specified, then the model will run without those inputs.
   (b) The user can input desired business rules 205A.
   (c) The desired business rules can be reloaded from previous inputs 205B.
   (d) The desired business rules can be suggested by Auto AI from previous model runs 205C.
   (e) Inputs for desired business rule include amount of effect and ranking of business rules by order of importance 205D.

(2) Identify Minimum Explainability Score:
   (a) This is an optional step; if no minimum explainability score is specified, then the model will run using a default baseline.

(3) User Identifies Minimum Model Performance:
   (a) Different measures can be used based on machine learning model type.
   (b) Example measures include accuracy, F1 score, mean square error, and adjusted R squared.

At block 210, upload new data for model training.

At block 215, perform auto artificial intelligence (AI) model generation to generate a new model.

Auto AI will run through epochs to generate a series of models before early stopping is performed. Below is the logic for early stopping. Early stopping will occur when Auto AI can no longer create models with the minimum explainability score and performance metric (accuracy). The auto AI model generation can involve a data to model scorer 215A, a model to business scorer 215A1, an add to business rule collector 215A2, and identifying the best model 215A1A.

At block 220, deploy the new model.

Figure 3:
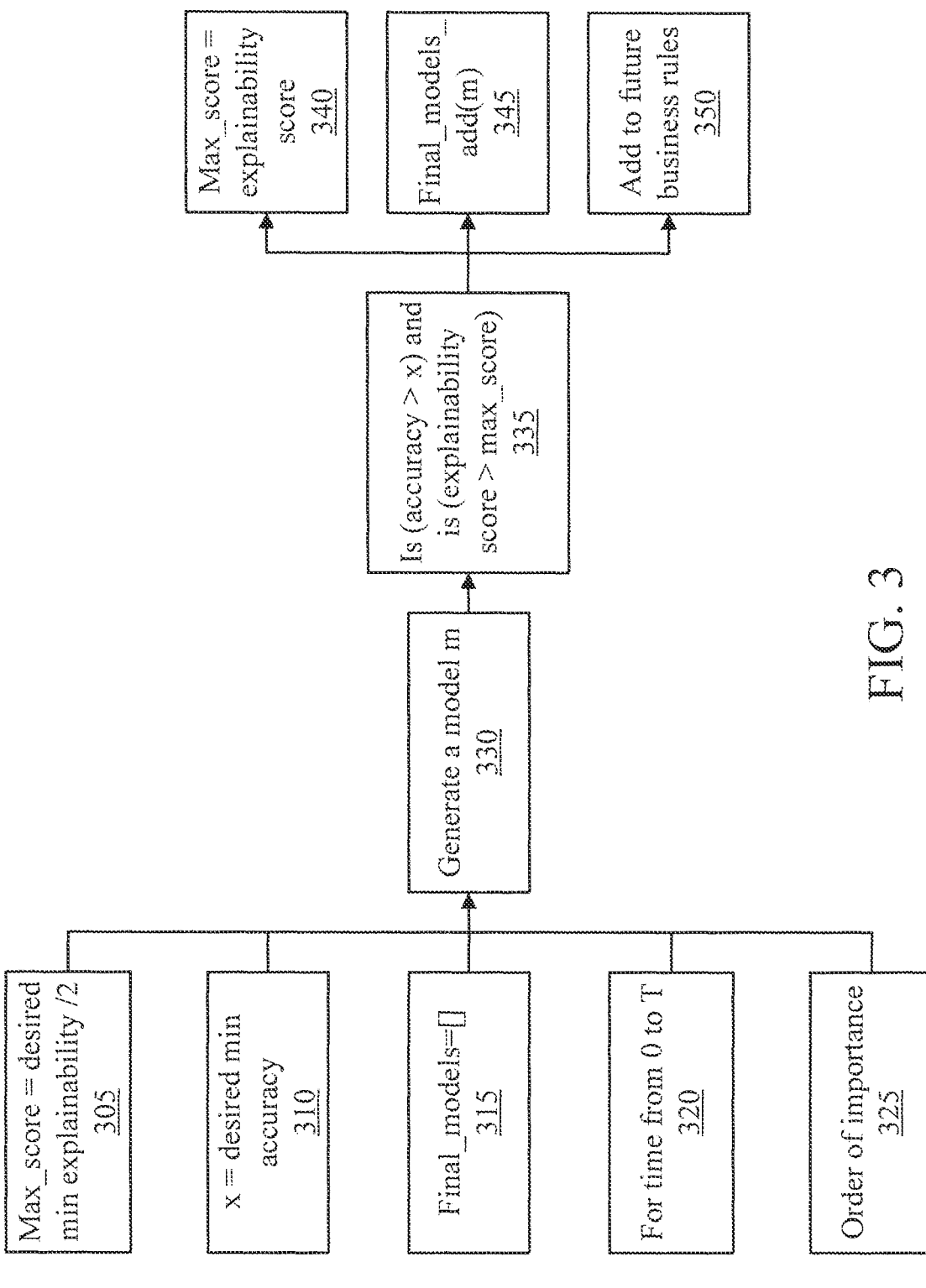
FIG. 3 is a block diagram showing an exemplary method for metric-based auto AI stopping, in accordance with an embodiment of the present invention.

FIG. 3 is a block diagram showing an exemplary method 300 for metric-based auto AI stopping, in accordance with an embodiment of the present invention.

At block 305, input max_score. "max_score"=desired minimum explainability/2.

At block 310, input x. "x"=desired minimum accuracy.

At block 315, input the final models [ ].

At block 320, set the time from 0 to T.

At block 325, rank final models by descending order of accuracy and pick the top model.

At block 330, generate a model m.

At block 335, after flattened learning, determine if (accuracy>x) and (explainability score>max_score).

If so, then set max_score=explainability score 340, add model m to the final model set 345, and add the corresponding business rules to future business rules 350.

Explainability Score

This is a combination of the following two components: (1) Data Model Scorer; and (2) Model to Business Rule Scorer. Any approach to combining the two resultant scores can be used such as averaging, weighting one of both based on one or more factors, and so forth. Linear or non-linear approaches to combining the scores can be used.

New Rules Added to Business Rule Collector

AutoAI will generate a series of models that fit the accuracy and explainability requirements. After early stopping is done, the best model is selected from the series. Business rules are then distilled from the best model and saved to a business rule collector. This collector information becomes available to the user to inform future selections of desired business rules in future model training.

Data Model Scorer

The Data Model Scorer incorporates multiple measures of data quality within the model. The final method of scoring may change during the implementation phase, but at the most basic level, this score is a combination of the subcomponent scores below.

Dimensionality Score

Variables:
   obs=Total number of observations in training dataset
   fts=Total number of features
   imp=Standard deviation of feature importance
   z=Factor to change impact of variable imp in score Dimensionality Score=
   If imp>0, then min (obs/(fts*z*imp), 1)
   If imp=0, then 1

Details:
- (a) Minimum imp is 0.
- (b) Maximum Dimensionality Score is 1.
- (c) As variable fts increases, the Dimensionality Score decreases.
- (d) As variable imp increases, the Dimensionality Score decreases.
- (e) Variable imp can be calculated for many different feature importance scoring methods (ex. Pearson correlation, Predictive Power Score, fit-time importance).
- (f) Variable z will increase or decrease impact of imp.
- (g) Final score to change based on experimentation.
- (h) Final score can be combination of heuristics and machine learning.

Inter Class Score

Variables:

ent=Normalized entropy of labels in training dataset

Score:

Inter Class Score=ent

Details:
- (a) As variable ent increases, the Inter Class Score increases.
- (b) The variable ent can be calculated for classification problems which feature categorial class values. (ex. normalized Shannon's entropy)
- (c) The variable ent can be calculated for regression problems which feature continuous class values. (ex. differential entropy)
- (d) Final score to change based on experimentation.
- (e) Final score can be combination of heuristics and machine learning.

Intra Class Score

Variables:

fi_f=Feature importance for each feature f fi_interpretation f=Interpretation of feature importance as [Very Low, Low, Medium, High, Very High]

prd_1=Count Very Low feature importance/Count all features prd_2=Count Low feature importance/Count all features prd_3=Count Medium feature importance/Count all features prd_4=Count High feature importance/Count all features prd_5=Count Very High feature importance/Count all features z1=importance factor of prd_1 z2=importance factor of prd_2 z3=importance factor of prd_3 z4=importance factor of prd_4 z5=importance factor of prd_5

Score:

$$\text{Intra Class Score} =$$
$$(z1 * \text{prd\_1}) + (z2 * \text{prd\_2}) + (z3 * \text{prd\_3}) + (z4 * \text{prd\_4}) + (z5 * \text{prd\_5})$$
$$\text{where } z1 < z2 < z3 < z4 < z5$$

Details:
- (a) Final score to change based on experimentation.
- (b) Final score can be combination of heuristics and machine learning.

Inter Feature Score

Variables:

corr_i_j=Absolute correlation coefficient of feature pairs [i, j] for all features fi_f=Feature importance for each feature f fi_interpretation_i_j=Interpretation of feature importance for each feature pair [i, j]

z_i_j=Importance factor based on fi_interpretation_i_j label for each feature pair [i, j]

Score:

$$\text{Inter Feature Score} = (z\_1 * \text{corr\_1\_2}) + (z\_2 * \text{corr\_1\_3}) +$$
$$(z\_3 * \text{corr\_1\_4}) + (z\_4 * \text{corr\_1\_5}) \ldots \text{ for all } [i, j]$$

Details:
- (a) Final score to change based on experimentation.
- (b) Final score can be combination of heuristics and machine learning.

Intra Feature Score

Variables:

ent f=Normalized entropy for each feature f fi_f=Feature importance for each feature f z_f=Importance factor based on fi_f for each feature f Score:

$$\text{Intra Feature Score} = (z\_1 * \text{ent\_1}) + (z\_2 * \text{ent\_2}) +$$
$$(z\_3 * \text{ent\_3}) + (z\_4 * \text{ent\_4}) + (z\_5 * \text{ent\_5}) \ldots \text{ for all } f$$

Details:
- (a) Final score to change based on experimentation.
- (b) Final score can be combination of heuristics and machine learning.

Model to Business Rule Scorer

The final method of scoring may change during the implementation phase, but at the most basic level, this score is a combination of the subcomponent scores below.

Original Business Rule Score

Variables:

br_cnt=Total number of features in model tagged as desired business rules ft_cnt=Total number of features in the model Score:

Original Business Rule Score=br_cnt/ft_cnt

Details:
- (a) Final score to change based on experimentation.
- (b) Final score can be combination of heuristics and machine learning.

New Rule Score

Variables:

new_cnt=Total number of features with above median feature importance in model not tagged as desired business rules ft_cnt=Total number of features in the model Score:

$$\text{New Rule Score} = 1 - (\text{new\_cnt/ft\_cnt})$$

Details:
- (a) Final score to change based on experimentation.
- (b) Final score can be combination of heuristics and machine learning.

Intra Feature Score

Variables:

br_imp=Sum feature importance of desired business rules all_imp=Sum feature importance of all features

9

Score:

$$\text{Intra Feature Score} = \text{br\_imp/all\_imp}$$

Details:
(a) Final score to change based on experimentation.
(b) Final score can be combination of heuristics and machine learning.

Inter Feature Score

Variables:
br_absent=Percentage of desired business rules not included in model

Score:
Inter Feature Score=br_absent

Details:
(a) Final score to change based on experimentation.
(b) Final score can be combination of heuristics and machine learning.

Figure 4:
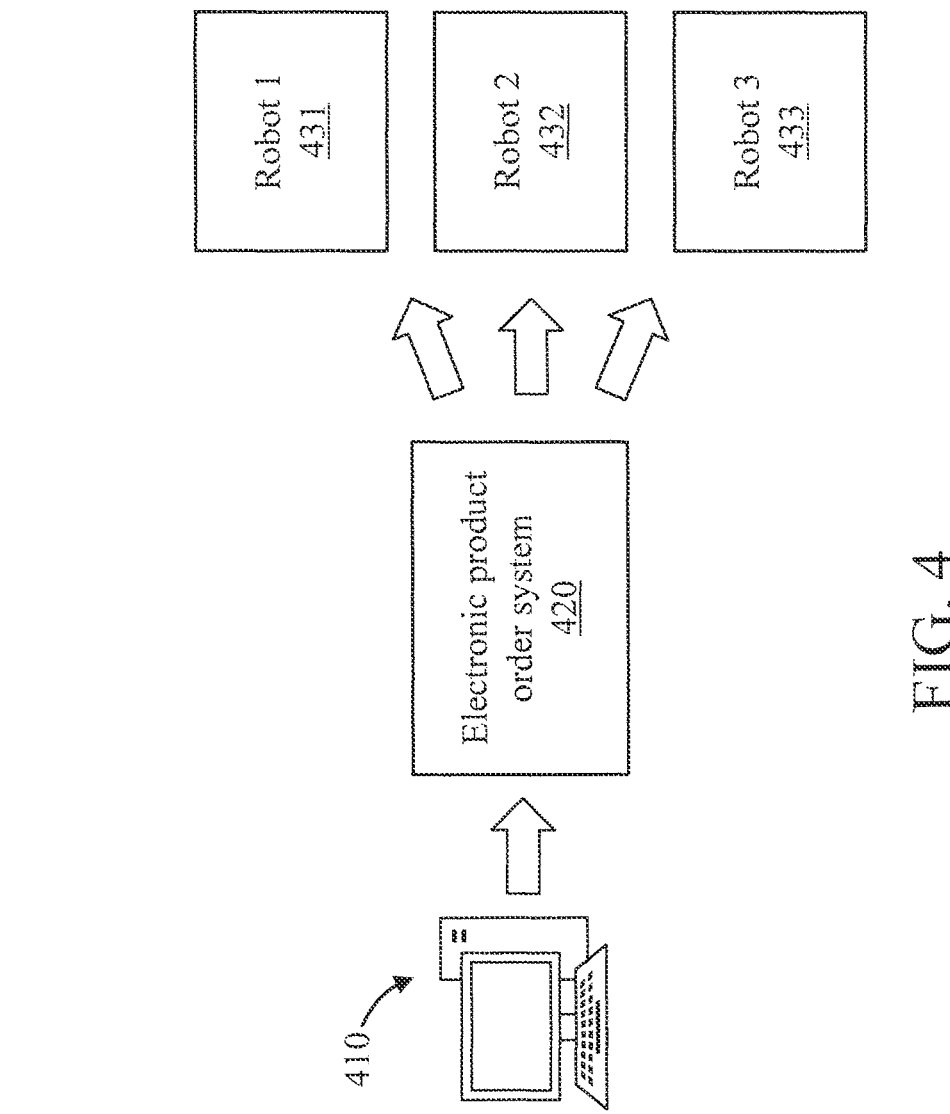
FIG. 4 is a block diagram showing an exemplary environment to which the present invention can be applied, in accordance with an embodiment of the present invention.

FIG. 4 is a block diagram showing an exemplary environment 400 to which the present invention can be applied, in accordance with an embodiment of the present invention.

The environment 400 relates to electronic model ordering. The environment 400 includes a model server 410 that forms, trains, and maintains AI models. The model server 410 is operatively coupled to an electronic product ordering system 420. A model of the model server 410 is deployed to generate a prediction of an amount of a product needed to be ordered and a reasoned justification for the amount, based on various inputs as described herein such as training data, current product stock, optional newly input or previously stored business rules relating to ordering based on current product stock, and so forth. The electronic product ordering system 420 automatically orders the amount of the product responsive to a prediction. This can be facilitated by one or more robots (robots 1-3 431-433) retrieving products off of shelves in a factory or storage facility and placing them in a loading area or in a delivery vehicle, relieving one or more humans from performing these tasks.

A description will now be given regarding consumer goods with different variations (e.g., clothing sales). Here, Auto AI places orders for each variation of product based on predicted future demand for the product. Explainability provides reasoning to company decision makers for each product purchased.

In such a case, the trained model is deployed to generate a prediction of an amount of a product needed to be ordered and a reasoned justification for the amount, and an electronic product ordering system automatically orders the product responsive to the prediction.

Business Rule: Decision Must be Based on:
40% historical demand
30% of one or more product properties
color
edging
length
material
20% of one or more industry cues
marketing materials
competitor offerings
endorsements
10% consumer sentiment
Have at least 95% accuracy
Run Auto AI to Generate a Version of Model:
Model: M1

10

80/100 Intra Class Score (Data Model Scorer) based on comparable predictiveness for features included in M1
90/100 Dimensionality Score (Data Model Scorer) based on high observation to feature ratio in M1
80/100 New Rule Score (Model to Business Rule Scorer) for low number of new features in M1 not in desired business rules
50/100 Inter Feature Score (Model to Business Rule Scorer) for number of desired business rules included in M1
Combined explainability score=0.75 ((80+90+80+50)/4)

Early stop to get the model having the best explainability scoring out of the models having >=0.95 accuracy where M1 is that model with the highest explainability score being 0.75

Output: Best Model+New Business Rules to Consider from Top Models

Top Models:
Model M1 (accuracy 0.95, explainability score 0.75)
Model M2 (accuracy 0.95, explainability score 0.40)
Model M3 (accuracy 0.96, explainability score 0.53)

Best Model: M1

Figure 5:
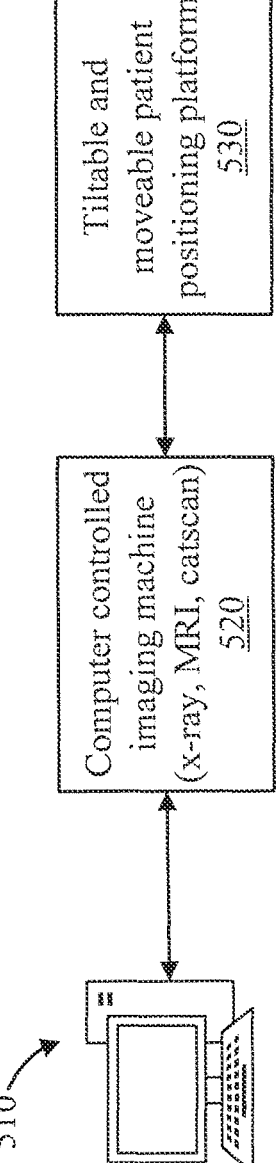
FIG. 5 is a block diagram showing another exemplary environment to which the present invention can be applied, in accordance with an embodiment of the present invention.

FIG. 5 is a block diagram showing another exemplary environment 500 to which the present invention can be applied, in accordance with an embodiment of the present invention.

The environment 500 relates to imaging device control based on a prediction. The prediction can identify existence of a cancerous or benign tumor and can optionally include tumor location information. The environment 500 includes a model server 510 that forms, trains, and maintains AI models. The model server 510 is operatively coupled to an imaging system 520. The imaging system 520 can be an x-ray machine, an MRI machine, a cat scan machine, and/or so forth. The imaging system 520 is also operatively coupled to a tiltable and moveable patient positioning platform 530. The platform 530 can be adjusted in up to 3 dimensions in order to place the patient in an optimum position to take images responsive to the prediction.

A description will now be given regarding an example directed to deploying the trained model to generate a prediction of an existence of a cancerous tumor and a reasoned justification for the existence at a predetermined location, and controlling an imaging machine to acquire images of the cancerous tumor at the predetermined location responsive to the prediction.

Business rule: Decision must be based on:
60% imaging
20% other tests
10% comorbidities
10% of one or more of patient chart:
age
race
diet
Have at least 95% accuracy
Run Auto AI to Generate a Version of the Model:
Model: M3
70/100 Dimensionality Score (Data Model Scorer) based on high number of observations to total number of features/feature importance used in M3
60/100 Inter Class Score (Data Model Scorer) for comparative number of positive cases to negative cases in training dataset
90/100 Original Business Rule Score (Model to Business Rule Scorer) based on high usage of desired business rules in M3

90/100 New Rule Score (Model to Business Rule Scorer) based on low usage of above median importance of features not found in desired business rules in M3

Combined explainability score of M3=0.78 ((70+60+90+90)/4)

Early stop to get the model having the best explainability scoring out of the models having >=0.95 accuracy where M3 is that model with the highest explainability score of 0.78.

Output: Best Model+New Business Rules to Consider from Top Models

Top Models:

Model M1 (accuracy 0.96, explainability score 0.49)

Model M2 (accuracy 0.97, explainability score 0.63)

Model M3 (accuracy 0.96, explainability score 0.78)

Best Model: M3

A description will now be given of an example of the invention, in accordance with an embodiment of the present invention. The example involves a loan approval use case.

Business Rule: Decision Must be Based on:

50% credit score;

40% income; and

10% of one or more of:

number of credit cards; and mortgage rate.

Have at least 95% (0.95) accuracy.

Run Auto AI to Generate a Version of the Model:

Model: M2

65/100 Inter Class Score (Data Model Scorer) for class distributions between age groups, race and region in the data 70/100 Inter Feature Score (Data Model Scorer) for sensitivity of model M2 to changes in standalone features and feature combinations 85/100 Intra Feature Score (Model to Business Rule Scorer) for the closeness of feature importance in model to desired business rule for model M2.

Combined explainability score of M2=0.73 ((65+70+85)/3)

Early stop to get the model having the best explainability scoring out of the models having >=0.95 accuracy where M2 is that model with the highest explainability score of 0.73.

Output: Best Model+New Business Rules to Consider from Top Models

Top Models:

Model M1 (accuracy 0.95, explainability score 0.58)

Model M2 (accuracy 0.97, explainability score 0.73)

Model M3 (accuracy 0.97, explainability score 0.60)

Best Model: M2

As a next step, the funds can be automatically dispensed via an ATM, the issuance of an electronic check, or via a bank-to-bank transfer. Going a step or two further, a transaction can be started or completed based on the approval of the loan such as performing a purchase of the item, subsequently delivering the item using at least a partially automated delivery system, electronically storing the title of the item in a remote secure database, and so forth.

These and other applications for model maintainability with model explainability are readily determined by one of ordinary skill in the art, given the teachings of the present invention provided herein.

Figure 8:
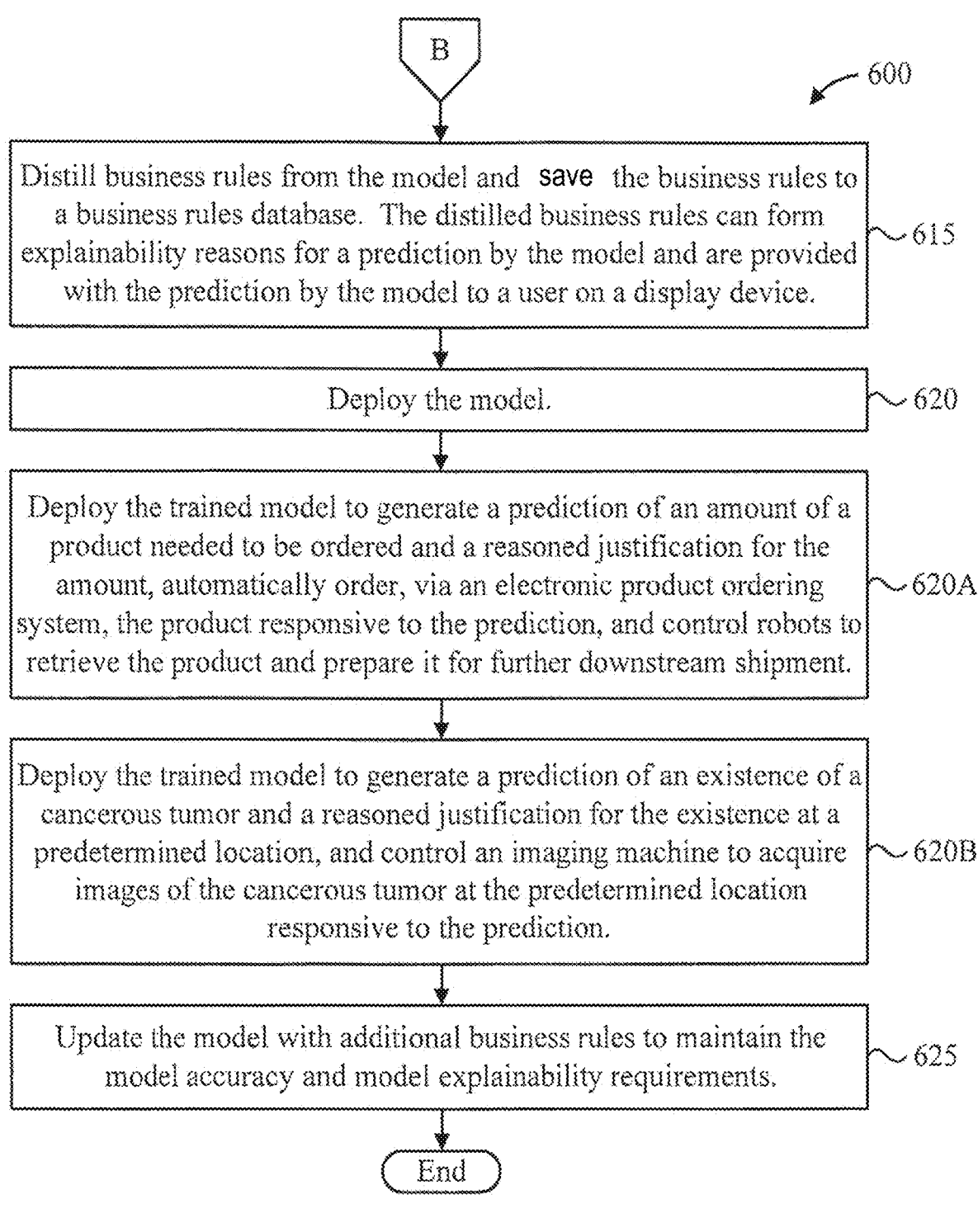

FIG. 6-8 are block diagrams showing an exemplary method 600, in accordance with an embodiment of the present invention.

At block 605, receive a first metric and a second metric of minimum model performance. The first metric relates to data modeling quality and the second metric relates to model to business rule correlations.

In an embodiment, block 605 can include one or more of blocks 605A and 605B. In an embodiment, block 605A can include one or more of blocks 605A1 through 605A3. In an embodiment, block 605B can include one or more of blocks 605B1 through 605B4.

At block 605A, configure the first metric to have up to five dimensions relating to data modeling quality and based on a combination of at least two of a standard deviation of feature importance based dimensionality score, an entropy based inter-class score, a feature importance based intra-class score, a feature-importance based inter-feature score, and a feature importance and entropy based intra-feature score.

At block 605A1, configure the standard deviation of feature importance based dimensionality score to decrease as a total number of features increases or a standard deviation of feature importance increases.

At block 605A2, configure the entropy based inter-class score to increase as a normalized entropy of labels in a training dataset increases.

At block 605A3, configure the feature importance based intra-class score to be based on counts of various levels of feature importance and importance factors of the counts.

At block 605B, configure the second metric to have up to four dimensions relating to model to business rule correlations and based on a combination of at least two of an original business rule score, a feature importance based new business rule score, a feature importance based intra feature score, and an inter-business-feature score.

At block 605B1, calculate the original business rule score as a ratio of a total number of features in the model tagged as desired business rules over a total number of features in the model.

At block 605B2, calculate the feature importance based new business rule score as one minus a ratio of a total number of features with above median feature importance and untagged as desired business rules over a total number features in the model.

At block 605B3, calculate the feature importance based intra feature score as a ratio of a sum of feature importance of desired business rules over a sum of feature importance of all features.

At block 605B4, the inter-business-feature score is calculated as a percentage of desired business rules absent from the model.

At block 610, perform auto Artificial Intelligence model generation responsive to training data and a combination of the first and the second metrics of minimum model performance to obtain a model that is trained and meets model accuracy and model explainability requirements represented by the combination of the first and the second metrics of minimum model performance. Block 610 is terminated when the auto Artificial Intelligence model generation can no longer create models with a minimum model accuracy and a minimum model explainability represented by the model accuracy and model explainability requirements.

At block 615, distill business rules from the model and save the business rules to a business rules database. The distilled business rules can form explainability reasons for a prediction by the model and are provided with the prediction by the model to a user on a display device.

At block 620, deploy the model.

In an embodiment, block 620 can include one or more of blocks 620A and 620B.

At block 620A, deploy the trained model to generate a prediction of an amount of a product needed to be ordered and a reasoned justification for the amount, automatically order, via an electronic product ordering system, the product responsive to the prediction, and control robots to retrieve the product and prepare it for further downstream shipment.

At block 620B, deploy the trained model to generate a prediction of an existence of a cancerous tumor and a reasoned justification for the existence at a predetermined location, and control an imaging machine to acquire images of the cancerous tumor at the predetermined location responsive to the prediction.

At block 625, update the model with additional business rules to maintain the model accuracy and model explainability requirements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for prediction model building with prediction explainability, comprising:

receiving, by a hardware processor, a first metric and a second metric of minimum model performance, the first metric relating to data modeling quality and the second metric relating to model to business rule correlations; and performing, by the hardware processor, auto artificial intelligence model generation responsive to training data and a combination of the first and the second metrics of minimum model performance to obtain a model that is trained and meets model prediction accuracy and model prediction explainability requirements represented by the combination of the first and the second metrics of minimum model performance;

wherein the first metric is based on a combination of at least two of a standard deviation of feature importance-based dimensionality score, an entropy-based inter-class score, a feature importance-based intra-class score, a feature importance-based inter-feature score, or a feature importance and entropy-based intra-feature score;

wherein the standard deviation of feature importance-based dimensionality score decreases as a total number of features increases or a standard deviation of feature importance increases.

2. The computer-implemented method of claim 1, wherein the first metric has up to five dimensions relating to the data modeling quality.

3. The computer-implemented method of claim 2, wherein the entropy-based inter-class score increases as a normalized entropy of labels in a training dataset increases.

4. The computer-implemented method of claim 2, wherein the feature importance-based intra-class score is based on counts of various levels of feature importance and importance factors of the counts.

5. The computer-implemented method of claim 1, wherein the second metric has up to four dimensions relating to the model to business rule correlations and is based on a combination of at least two of an original business rule score, a feature importance-based new business rule score, a feature importance-based intra-feature score, and an inter-business-feature score.

6. The computer-implemented method of claim 5, wherein the original business rule score is calculated as a ratio of a total number of features in the model tagged as desired business rules over a total number of features in the model.

7. The computer-implemented method of claim 5, wherein the feature importance-based new business rule score is calculated as one minus a ratio of a total number of features with above median feature importance and untagged as desired business rules over a total number of features in the model.

8. The computer-implemented method of claim 5, wherein the feature importance-based intra-feature score is calculated as a ratio of a sum of feature importance of desired business rules over a sum of feature importance of all features.

9. The computer-implemented method of claim 5, wherein the inter-business-feature score is calculated as a percentage of desired business rules absent from the model.

10. The computer-implemented method of claim 1, wherein the model is trained further using desired business rules and a ranking of the desired business rules by order of importance.

11. The computer-implemented method of claim 1, wherein the method is terminated when the auto artificial intelligence model generation can no longer create models with a minimum model prediction accuracy and a minimum model prediction explainability represented by the model prediction accuracy and model prediction explainability requirements.

12. The computer-implemented method of claim 1, further comprising distilling business rules from the model and saving the business rules to a business rules database.

13. The computer-implemented method of claim 12, wherein the distilled business rules form explainability reasons for a prediction by the model and are provided with the prediction by the model to a user on a display device.

14. The computer-implemented method of claim 1, further comprising:

deploying the trained model to generate a prediction of an amount of a product needed to be ordered and a reasoned justification for the amount;

automatically ordering, via an electronic product ordering system, the product responsive to the prediction; and controlling robots to retrieve the product and prepare it for further downstream shipment.

15. The computer-implemented method of claim 1, further comprising:

deploying the trained model to generate a prediction of an existence of a cancerous tumor and a reasoned justification for the existence at a predetermined location; and controlling an imaging machine to acquire images of the cancerous tumor at the predetermined location responsive to the prediction.

16. The computer-implemented method of claim 1, wherein the model prediction accuracy and model prediction explainability requirements represented by the combination of the first and the second metrics of minimum model performance form training phase stopping criteria.

17. The computer-implemented method of claim 1, further comprising updating the model with additional business rules to maintain the model prediction accuracy and model prediction explainability requirements.

18. A computer program product for prediction model building with prediction explainability, the computer program product comprising a non-transitory computer readable storage medium having program instructions embodied therewith, the program instructions executable by a computer to cause the computer to perform a method comprising:

receiving, by a hardware processor, a first metric and a second metric of minimum model performance, the first metric relating to data modeling quality and the second metric relating to model to business rule correlations; and performing, by the hardware processor, auto artificial intelligence model generation responsive to training data and a combination of the first and the second metrics of minimum model performance to obtain a model that is trained and meets model prediction accuracy and model prediction explainability requirements represented by the combination of the first and the second metrics of minimum model performance;

wherein the first metric is based on a combination of at least two of a standard deviation of feature importance-based dimensionality score, an entropy-based inter-class score, a feature importance-based intra-class score, a feature importance-based inter-feature score, or a feature importance and entropy-based intra-feature score;

wherein the standard deviation of feature importance-based dimensionality score decreases as a total number of features increases or a standard deviation of feature importance increases.

19. A computer-implemented system for prediction model building with prediction explainability, comprising:

a memory device for storing program code; and a processor device operatively coupled to the memory device for running the program code to:

receive a first metric and a second metric of minimum model performance, the first metric relating to data modeling quality and the second metric relating to model to business rule correlations; and perform auto artificial intelligence model generation responsive to training data and a combination of the first and the second metrics of minimum model performance to obtain a model that is trained and meets model prediction accuracy and model prediction explainability requirements represented by the combination of the first and the second metrics of minimum model performance;

wherein the first metric is based on a combination of at least two of a standard deviation of feature importance-based dimensionality score, an entropy-based inter-class score, a feature importance-based intra-class score, a feature importance-based inter-feature score, or a feature importance and entropy-based intra-feature score;

wherein the standard deviation of feature importance-based dimensionality score decreases as a total number of features increases or a standard deviation of feature importance increases.

\* \* \* \* \*